United States Patent [19]

Katagiri et al.

[11] Patent Number: 4,763,995

[45] Date of Patent: Aug. 16, 1988

[54] SPACERS WITH ALIGNMENT EFFECT AND SUBSTRATES HAVING A WEAK ALIGNMENT EFFECT

[75] Inventors: Kazuharu Katagiri, Yokohama; Shuzo Kaneko, Tokyo, both of Japan

[73] Assignee: Canon Kabushiki Kaisha, Tokyo, Japan

[21] Appl. No.: 941,557

[22] Filed: Dec. 11, 1986

Related U.S. Application Data

[63] Continuation of Ser. No. 602,965, Apr. 23, 1984.

[30] Foreign Application Priority Data

Apr. 28, 1983 [JP] Japan ................................. 58-75849
Jul. 30, 1983 [JP] Japan ............................... 58-138708
Jul. 30, 1983 [JP] Japan ............................... 58-138709

[51] Int. Cl.$^4$ .......................................... G02F 1/133
[52] U.S. Cl. ................................. 350/341; 350/339 R; 350/344; 350/350 S
[58] Field of Search ............ 350/344, 341, 346, 350 S, 350/339 R, 340, 338

[56] References Cited

U.S. PATENT DOCUMENTS

| | | | |
|---|---|---|---|
| 3,700,306 | 10/1972 | Cartmell et al. | 350/341 |
| 3,787,110 | 1/1974 | Berreman et al. | 350/341 |
| 3,863,332 | 2/1975 | Leupp et al. | 350/344 |
| 3,912,366 | 10/1975 | Sprokel | 350/338 X |
| 3,932,026 | 1/1976 | Sprokel | 350/339 R |
| 3,947,184 | 3/1976 | Saeva et al. | 350/340 |
| 4,050,786 | 9/1977 | Feldman | 350/344 |
| 4,158,484 | 6/1979 | Nishiyama | 350/339 R X |
| 4,192,060 | 3/1980 | Washizuka et al. | 350/340 X |
| 4,251,137 | 2/1981 | Knop et al. | 350/341 X |
| 4,264,149 | 4/1981 | Zwart et al. | 350/346 |
| 4,311,785 | 1/1982 | Ahne | 350/339 R X |
| 4,362,771 | 12/1982 | Umeda et al. | 350/344 X |
| 4,561,726 | 12/1985 | Goodby et al. | 350/350 S |
| 4,568,149 | 2/1986 | Sugata et al. | 350/339 R X |

FOREIGN PATENT DOCUMENTS 0083822 7/1983 European Pat. Off. ............ 350/346

OTHER PUBLICATIONS

Kondo et al., "A Practical Method of Preparing Thin Homogeneous Ferroelectric Smectic Cells for Electro-Optical Microsecond Switches: Alignment Control of Liquid Crystal Molecules Utilizing Spacer Edges", Jap. J. Appl. Phys., vol. 22, No. 2, pp. L85-L87., Feb. 1983.

Penz et al., "11.7/4:50 P.M.: Plastic Substrate LCD", SID 81 DIG., pp. 116-117.

*Primary Examiner*—Stanley D. Miller
*Assistant Examiner*—David Lewis
*Attorney, Agent, or Firm*—Fitzpatrick, Cella, Harper & Scinto

[57] ABSTRACT

An optical modulation device comprises a liquid crystal having bistability between a pair of parallel base plates oppositely spaced from each other. A plurality of structural members having side walls are arranged at a substantially equal interval between the pair of parallel base plates so as to be in contact with at least one of them. Further, side walls of the plurality of structural members are treated for horizontal orientation in parallel with the extending direction of the structural members, and have a wall effect for orienting liquid crystal molecules in the direction of the horizontal orientation treatment.

21 Claims, 11 Drawing Sheets

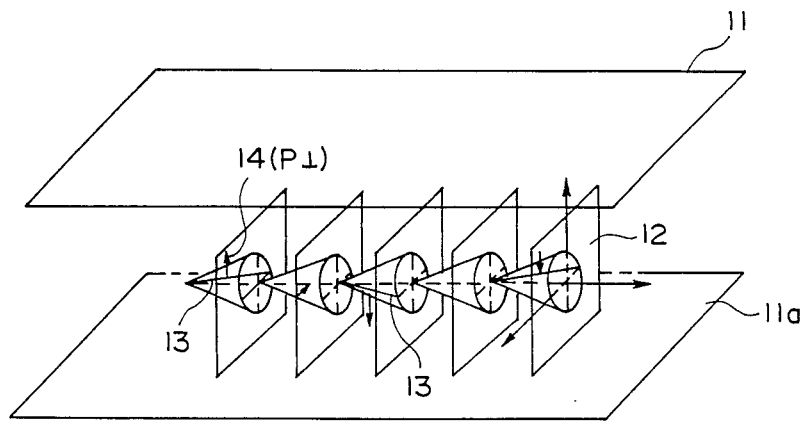
F I G. 1
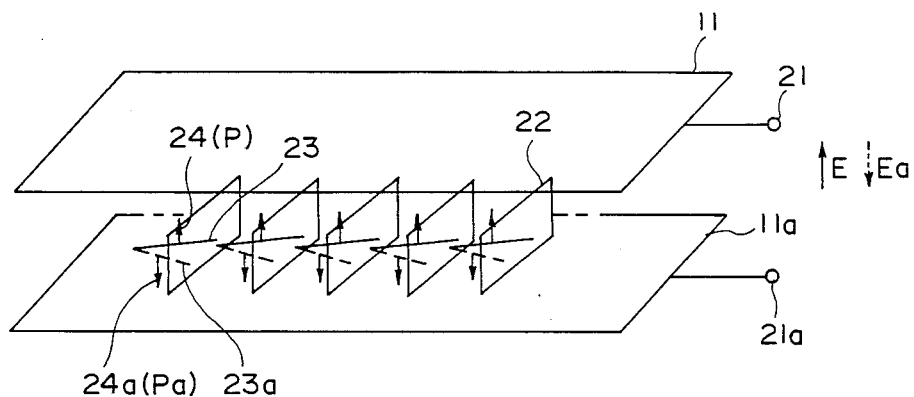
F I G. 2

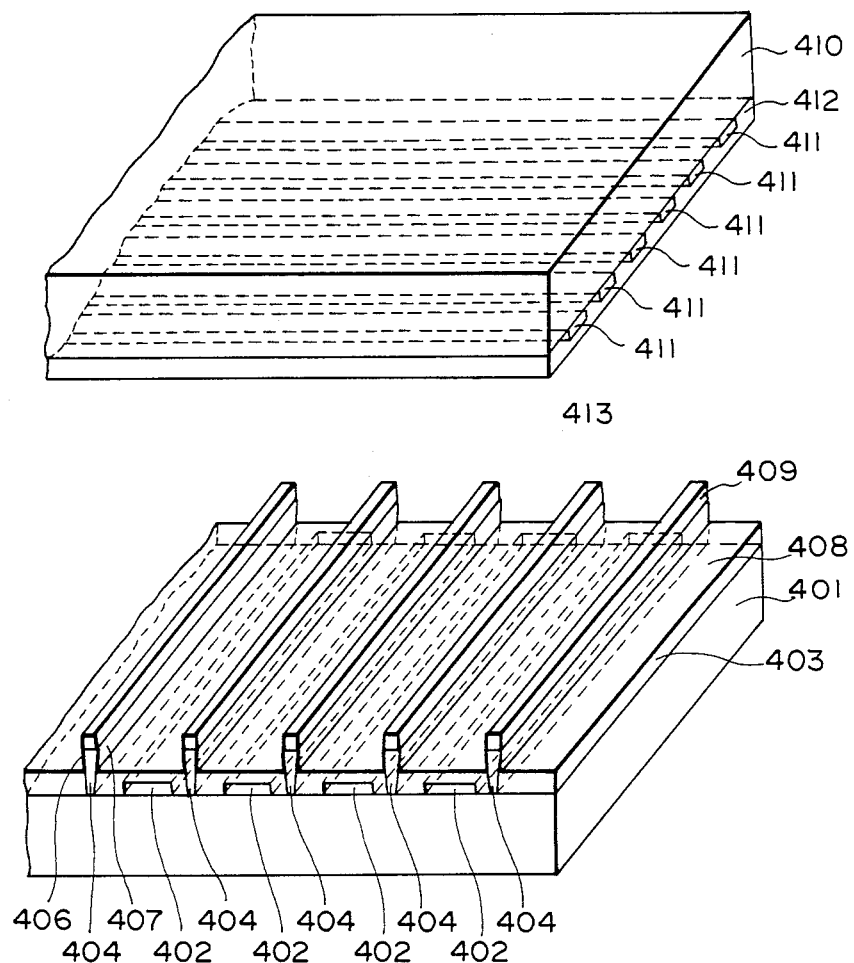
F I G. 4A

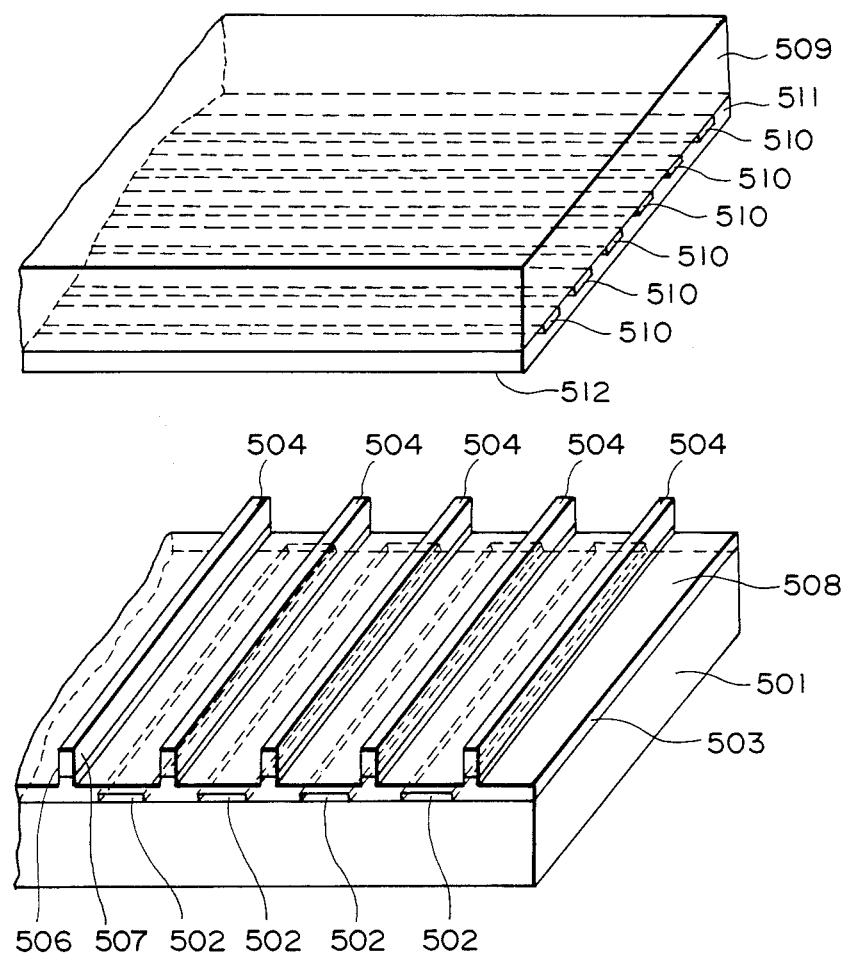
F I G. 5A

SPACERS WITH ALIGNMENT EFFECT AND SUBSTRATES HAVING A WEAK ALIGNMENT EFFECT

This application is a continuation of application Ser. No. 602,965 filed Apr. 23, 1984.

BACKGROUND OF THE INVENTION

1. Field of the Invention

The present invention relates to an optical modulation device using a liquid crystal, e.g. a liquid crystal, display device, a liquid crystal-optical shutter array, etc. and more particularly to an optical modulation device having improved display and driving characteristics through improved initial orientation of liquid crystal molecules, and a method of producing the same.

2. Description of the Prior Art

Hitherto, liquid crystal display devices have been well known, which comprise a group of scanning electrodes and a group of signal electrodes arranged in a matrix, and a liquid crystal compound filled between both electrode groups to form a plurality of picture elements to display images or information at matrix intersecting points. For driving these display devices, there is employed a time sharing driving method comprising selectively applying address signals sequentially and periodically to the group of scanning electrodes and selectively applying certain information signals to the group of signal electrodes in a parallel fashion in synchronism with the address signals. However, these display devices and the driving method therefor have serious drawbacks which are be described below.

Namely, it is difficult to obtain a high density of picture elements or a large image area. Because of the relatively high response speed and low power dissipation, most of the liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128. In liquid crystals of this type, molecules of nematic liquid crystals which show positive dielectric anisotropy under no application of an electric field form a structure twisted in the thickness direction of the liquid crystal layers (helical structure), and molecules of this liquid crystal form a structure aligned or oriented parallel to each other near the surfaces of both electrodes. On the other hand, nematic liquid crystals which show positive dielectric anisotropy under application of an electric field are oriented or aligned in the direction of the electric field, thus permitting optical modulation. When display devices are constructed in a matrix electrode arrangement using a liquid crystal of this type, a voltage higher than a threshold level required for aligning liquid crystal molecules in the direction perpendicular to the electrode surfaces is applied to an area (a selected point) where a scanning electrode and a signal electrode are selected at a time, whereas a voltage is not applied to areas (non-selected points) where scanning electrodes and signal electrodes are not selected. Accordingly, the liquid crystal molecules are stably aligned parallel to the electrode surfaces. When linear polarizers having a cross nicol relationship to each other (i.e. their polarizing axes are arranged perpendicular to each other) are arranged on the upper and lower sides of the liquid crystal cell thus formed, light is not transmitted at selected points while it is transmitted at non-selected points. Thus, the liquid crystal cell can function as an image device.

However, when a matrix electrode arrangement is formed, a certain electric field is applied to regions where a scanning electrode is selected and signal electrodes are not selected, or regions where scanning electrodes are not selected and a signal electrode is selected (which regions are called "half selected points"). If the difference between a voltage applied to the selected points and a voltage applied to half selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio), during which an effective electric field is applied to one selected point when a whole image area (corresponding to one frame) is scanned, decreases with a ratio of 1/N. Accordingly, the larger the number of scanning lines, the smaller is the voltage difference of an effective value applied to a selected point and non-selected points when scanning is repeatedly effected. As a result, this leads to unavoidable disadvantages of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface in their stable state and are vertically oriented with respect to the electrode surface only when an electric field is effectively applied) is driven (i.e. repeatedly scanned) by use of a time storage effect. To overcome these drawbacks, the voltage averaging method, the two-frequency driving method, the multiple matrix method, etc. have been already proposed. However, these methods do not sufficiently overcome the above-mentioned drawbacks. As a result, development of a large image area or a high packaging density of the display elements has been delayed because it is difficult to sufficiently increase the number of scanning lines.

Meanwhile, turning to the printer field, as means for obtaining a hard copy in response to input electric signals, a Laser Beam Printer (LBP) providing electric image signals to an electrophotographic photosensitive member in the form of light is excellent in terms of the density of picture elements and the printing speed.

However, the LBP has drawbacks as follows.

(1) The device becomes large in size.

(2) There are high speed mechanically movable parts, such as a polygon scanner, resulting in noise and requiring strict mechanical precision, etc.

In order to eliminate the drawbacks stated above, a liquid crystal shutter-array for changing electric signals to optical signals is proposed. When picture element signals are given with a liquid crystal shutter-array, for instance, 4000 signal generators are required for writing picture element signals a length of 200 mm at a ratio of 20 dots/mm. Accordingly, in order to independently feed signals to respective signal generators, wiring of lead lines for feeding electric signals to all of the respective signal generators is required, resulting in difficulties in production.

In view of this, another attempt was made to apply image signals corresponding to one line in a time-sharing manner with signal generators correspondingly divided into a plurality of lines. With this attempt, signal feeding electrodes can be common with the plurality of signal generators, thereby remarkably reducing the amount of wiring required. However, if an attempt is made to increase the number (N) of lines using a liquid crystal showing no bistability as is usually practiced, a signal "ON" time is substantially reduced to 1/N. This results in difficulties that the amount of light obtained on a photo-sensitive member is lowered, crosstalk occurs, etc.

To overcome the drawbacks of such prior art liquid crystal devices, the use of liquid crystal devices having bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, in contrast to optical modulation devices in which the above-mentioned TN-type liquid crystals are used, the bistable liquid crystal molecules are oriented to first and second optically stable states with respect to one and the other electric field vectors, respectively. The characteristics of the liquid crystals of this type are such that they are oriented to either of two stable states at an extremely high speed and the states are maintained when an electric field is not supplied thereto. By making use of such characteristics, these liquid crystals having chiral smectic phase can essentially diminish a large number of problems of the prior art TN-type devices. This is described in detail hereinafter in relation to the present invention.

However, in order that an optical modulation device in which a liquid crystal having bistability is used can realize desired driving characteristics, it is required that the liquid crystal disposed between a pair of parallel base plates has a molecule arrangement such that the molecules can effectively be switched between the two stable states independent of the application of an electric field. For instance, in connection with ferroelectric liquid crystals having SmC*- or SmH*-phase, it is required that there is formed a region (monodomain) where liquid crystal layers having SmC*- or SmH-phase are vertical to the surface of base plates, i.e. the liquid crystal axis is aligned substantially in parallel therewith. However, with optical modulation devices in which a liquid crystal having bistability is used, the orientation of the liquid crystal having such a monodomain structure has not satisfactorily been formed, thus failing to obtain sufficient display characteristics.

For instance, in order to give such an orientation, Clark et al., have proposed a method of applying an electric field, a method of applying shearing stress, and a method of arranging ridges in parallel with each other at a small interval between base plates, etc. However, these methods could not necessarily provide satisfactory results. For instance, the method of applying an electric field requires a large scale apparatus and is not compatable with a thin layer cell having excellent operational characteristics. Further, the method of applying a shearing stress is not compatible with a method of filling a liquid crystal after a cell is prepared. Furthermore, the method of arranging parallel ridges within the cell cannot provide a stable orientation effect by itself.

Meanwhile, in the liquid crystal device in which the above mentioned TN-type liquid crystal is used, in order to form a monodomain of liquid crystal molecules in parallel with the surface of a base plate, for instance, a method of rubbing the surface of the base plate with a cloth, etc., or a method of effecting oblique vapor deposition of SiO, etc. has been used. In accordance with the rubbing method, liquid crystal molecules assume a lowest energy (i.e., stable) state where they align preferentially along the rubbing direction, because the molecules are orientated due to grooves formed by rubbing on the surface of a base plate, or a combined effect of the grooves and a certain effect produced by rubbing, the nature of which has not necessarily been clarified. Thus, a certain "wall effect" for preferentially orienting liquid crystals in one direction is given to such a rubbed surface. A structure having a plane to which such wall effect is given is shown in, e.g. Canadian Pat. No. 1010136, etc. by W. Helfrich and M. Schadt. In addition to the rubbing method for forming the wall effect, another method is employed, in which a structure having a plane formed by oblique vapor deposition of SiO or $SiO_2$ on a base plate is used, and the plane having a uniaxial anisotropy of SiO or $SiO_2$ has a wall effect for preferentially orienting liquid crystal molecules in one direction.

As stated above, the alignment or orientation control method, e.g. the rubbing method or the oblique-deposition method, is one of the preferable methods for producing liquid crystal devices. However, if the alignment control is implemented to liquid crystals having bistability by these methods, a plane having a wall effect for preferentially aligning a liquid crystal only in one direction is formed, thereby deteriorating the desirable characteristics of the bistable liquid crystals such as bistability with respect to an electric field applied thereto, high responsiveness or monodomain forming ability. Accordingly, in the field of ferroelectric liquid crystals attention has not been drawn to the employment of the rubbing method or the oblique-deposition method as a means for controlling alignment of liquid crystals.

SUMMARY OF THE INVENTION

With the above in view, a primary object of the present invention is to provide an optical modulation device and a method of producing the same applicable to such optical modulation devices comprising liquid crystal having bistability, which are potentially suitably for display devices having high speed responsiveness, high density of picture elements and a large image area; or optical shutters having a high shutter speed etc., and capable of sufficiently realizing their characteristics by improving monodomain forming ability or initial orientation, which have been problems in the prior art.

As a result of further studies for achieving the above-mentioned object, we have found that a monodomain structure, having excellent compatibility with operational characteristics based on bistability of a liquid crystal, is obtained by arranging a structural member having side walls, e.g., ridges, etc. between a pair of base plates between which a liquid crystal is interposed to give a wall effect due to horizontal alignment selectively to the side walls, instead of giving a horizontal alignment effect, e.g., rubbing, etc. uniformly to the surfaces of a pair of parallel base plates.

Namely, the present invention is characterized by an optical modulation device comprising a liquid crystal having bistability interposed between a pair of parallel base plates wherein a plurality of structural members having side walls are arranged in contact with at least one of the base plates between the pair of parallel base plates, and a horizontal orientation or alignment treatment is implemented to the side walls of the plurality of structural members in parallel with a direction along which the structural members extend, thereby allowing liquid crystal molecules to be aligned in the direction of the horizontal orientation treatment.

BRIEF DESCRIPTION OF THE DRAWINGS

In the drawings,

FIG. 1 is a perspective view schematically illustrating an optical modulation device in which a chiral smectic liquid crystal is used, FIG. 2 is a perspective view schematically illustrating bistability of the optical modulation device shown in FIG. 1, FIG. 4A is a perspective view illustrating another embodiment of the optical modulation device according to the present invention, FIG. 5A is a perspective view illustrating a further embodiment of the optical modulation device according to the present invention.

DETAILED DESCRIPTION OF THE INVENTION

Figure 3A:
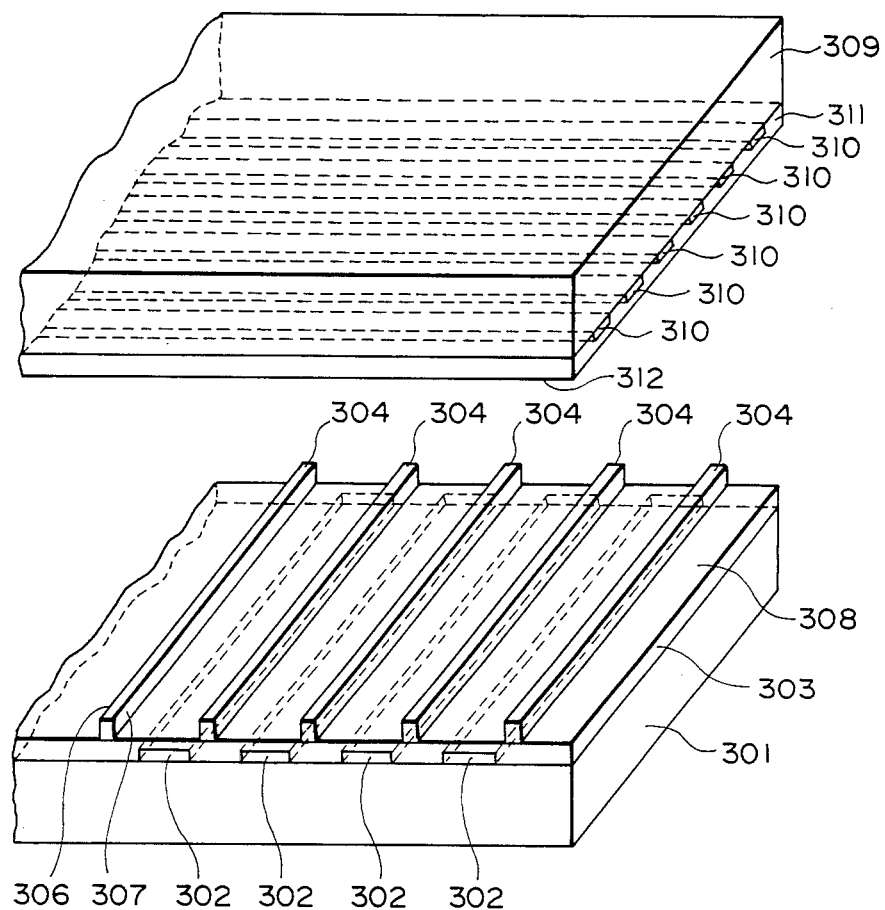
FIG. 3A is a perspective view illustrating an embodiment of the optical modulation device according to the present invention.

In a preferred embodiment, there is provided an optical modulation device in which a liquid crystal having bistability is interposed between a pair of parallel base plates wherein the pair of parallel base plates are provided with a structural member having a plane to which a wall effect for orienting the liquid crystal having bistability preferentially in one direction is not given or a weak wall effect is given and preferably serving as an insulating film, and a plurality of structural members are arranged between the parallel base plates, each of which comprises a side wall having a wall effect for orientating the liquid crystal having bistability in parallel with the pair of parallel base plates or substantially parallel therewith preferentially in one direction and, preferably, also serves as a spacer member.

Liquid crystals having bistability which can be used in the present invention have ferroelectricity. More specifically, liquid crystals having chiral smectic C- (SmC*) or H-(SmH*) phase may be used. These liquid crystals assume bistable states, i.e. first and second optically stable states with respect to an electric field applied thereto. Accordingly, they are different from the above-mentioned TN-type liquid crystals used in the conventional optical modulation device, wherein the liquid crystal is oriented to first and second optically stable states, e.g. with respect to two electric field vectors, respectively.

Ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980 "Submicro Second Bistable Electrooptic Switching in Liquid Crystals"; "Applied Physics" 16 (141) 1981 "Liquid Crystals", etc. In the present invention, ferroelectric liquid crystals disclosed in these publications may be used.

Examples of ferroelectric liquid crystal compounds include decyloxybenzylidene-P'-amino-2-methylbutyl cinnamate (DOBAMBC), hexyloxybenzylidene-P'-amino-2-chloropropyl cinnamate (HOBACPC), 4-0-(2-methyl)-butyl-resorcylidene-4'octylaniline (MBRA 8), etc.

When a liquid crystal device is constituted by using these materials, for the purpose of maintaining a temperature so that the liquid crystal compound assumes SmC*- or SmH*-phase, the device may be supported, if necessary, by a block of copper in which a heater is embedded, or a suitable supporting member.

FIG. 1 is a view schematically illustrating an example of a liquid crystal cell for the purpose of explaining the operation of a ferroelectric liquid crystal. Reference numerals 11 and 11a denote base plates (glass plates) coated with transparent electrodes comprising thin films of $In_2O_3$, $SnO_2$, ITO (Indium-Tin Oxide), etc. A liquid crystal having SmC*- or SmH*- phase in which liquid crystal layers 12 are oriented vertically to the surfaces of two base plates is hermetically disposed between base plates 11 and 11a. Full lines 13 denote liquid crystal molecules, respectively. These liquid crystal molecules 13 have dipole moments (P⊥) 14 perpendicular to the molecules. When a voltage higher than a certain threshold is applied between electrodes on the base plates 11 and 11a, the helical structures of the liquid crystal molecules 13 are loosened. Thus, the orientation directions of the liquid crystal molecules 13 can be changed so that the dipole moments (P⊥) 14 are all directed in the direction of the applied electric field. Liquid crystal molecules 13 have elongated shapes, and show refractive index anisotropy between the long and short axes. Accordingly, it is easily understood that, for instance, when polarizers having a cross nicol relationship to each other, (i.e., their polarizing axes are crossing or perpendicular to each other) are arranged on the upper and lower sides of glass surfaces, a liquid crystal modulation device of which optical characteristics change depending upon the polarity of an applied voltage can be realized. The thickness of a liquid crystal cell preferably used in the optical modulation device according to the present invention can be made sufficiently thin (e.g. less than 10μ). Accordingly, as the thickness of the liquid crystal layers becomes thin, the helical structures of the liquid crystal molecules are loosened even under no application of an electric field as shown in FIG. 2. Dipole moments P and Pa can change in either direction, i.e. in an upper (24) or lower (24a) direction, respectively. When electric fields E and Ea having polarities different from each other and higher than a certain threshold level are applied to the cell thus formed with voltage applying means 21 and 21a, the dipole moments change in the upper (24) or lower (24a) direction, depending upon the electric field vector of the electric field E or Ea, respectively. In accordance with the changes, the liquid crystal molecules are oriented to either a first stable state 23 or a second stable state 23a.

As previously mentioned, the application of such ferroelectric liquid crystal to an optical modulation device can provide two major advantages. First is that the response speed is quite fast. Second is that the liquid crystal molecules show bistability in regard to their orientation. The second advantage is further explained, e.g., with reference to FIG. 2. When the electric field E is applied, the liquid crystal molecules are oriented to the first stable state 23. This state is stably maintained even if the applied electric field is removed. On the other hand, when the opposite electric field Ea is applied, they are oriented to the second stable state 23a to change their directions. Likewise, the latter state is stably maintained even if the applied electric field is removed. Further, as long as the given electric field E is not above a certain threshold level, they are maintained at respective oriented states. For effectively realizing such high response speed and bistability, it is preferable that the thickness of the cell be as thin as possible.

The most serious problem when a device is formed with a ferroelectric liquid crystal is that it is difficult to form a cell having a uniform monodomain of liquid crystal in which layers having SmC*- or SmH*-phase are arranged in a direction perpendicular to the base plate surfaces and liquid crystal molecules are arranged substantially parallel to the base plate surfaces, as previously mentioned. A primary object of the invention is to solve this difficulty.

Figure 3B:
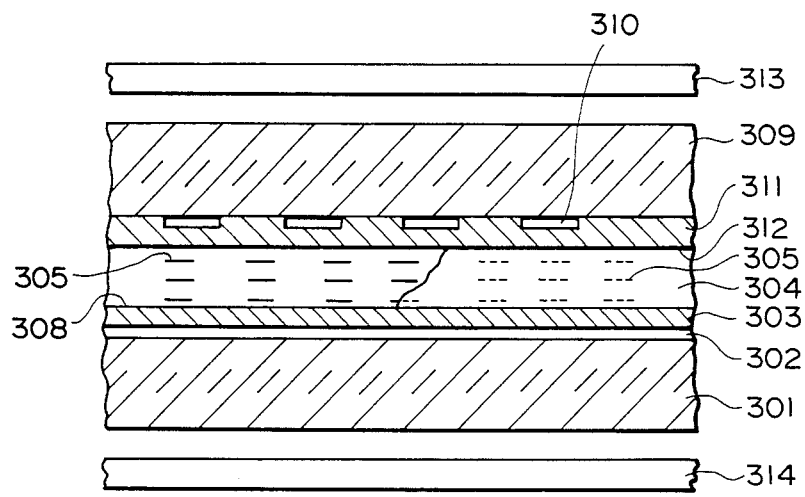
FIG. 3B shows a side cross sectional view of the optical modulation device shown in FIG. 3A.
Figure 3C:
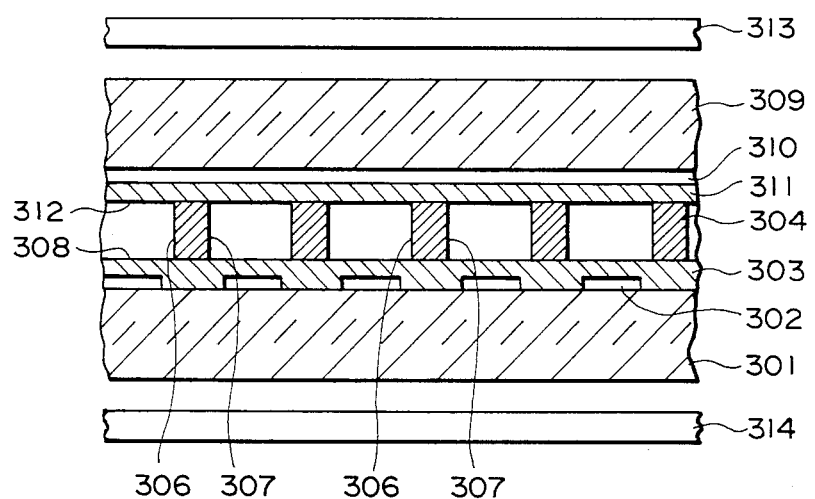
FIG. 3C shows a front cross sectional view of the optical modulation device shown in FIG. 3A.

FIG. 3A shows a perspective view of an optical modulation device according to the present invention. FIG. 3B and FIG. 3C respectively show a side cross sectional view and a front cross sectional view thereof.

In FIG. 3, a group of (scanning) electrodes comprising a plurality of electrodes 302 are formed in a predetermined pattern by etching on a base plate 301 of glass, plastic, etc. On the electrodes, an insulating film 303 is formed. On the insulating film 303, a plurality of spacer members are formed and arranged in a stripe form. The spacer members may be formed in shapes other than the stripe shape. It is preferable that the spacer members 304 are formed by selecting a suitable material selected from materials having a hardness lower than that of the insulating film 303. For example, there may be used resins such as polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamine resin, urea resin, acrylic resin, etc., photosensitive polyimide, photosentive polyamide, cyclic rubber photoresist, phenol novolac photoresist, electron beam resist (polymethyl methacrylate, epoxidized-1,4-polybutadiene, etc.)

On the other hand, the insulating film 303 may be selected from materials capable of preventing electric currents from flowing into molecular layers of the liquid crystal 305 and having a hardness higher than that of the above-mentioned spacer members 304. For instance, the insulating film 303 may be formed by using compounds selected from silicon nitride, silicon nitride containing hydrogen, silicon carbide, silicon carbide containing hydrogen, boron nitride, boron nitride containing hydrogen, cerium oxide, silicon oxide, aluminum oxide, zirconium, magnesium fluoride, etc. The insulating film 303 can provide the advantage of preventing occurrence of electric currents produced due to a small amount of impurities, etc. contained in the liquid crystal molecular layers. Accordingly, the insulating film 303 prevents a liquid crystal compound from deteriorating even after repeated operation of the device. The thickness of the insulating film 303 is usually set to a range of from 50 Å to 0.5μ, preferably from 500 Å to 5000 Å, although it depends upon the electron injection preventing ability inherent to the material used and the thickness of a liquid crystal layer. On the other hand, the thickness of the liquid crystal layer is determined in accordance with the height of the spacer members 304, although it depends upon the ease of orientation inherent to the liquid crystal material used and the response speed required for the device. It is usually set to a range of from 0.2μ to 200μ, preferably from 0.5μ to 10μ. The width of the spacer member 304 is set to a range usually from 0.5μ to 50μ, preferably from 1μ to 20μ. The distance (interval) between adjacent spacer members 304 is usually set to a range of from 10μ to 2 mm, preferably from 50μ to 700μ, because, if it is too large, the uniform orientation of the liquid crystal molecules is prevented. On the contrary, if it is too small, the valid area of the liquid crystal optical device is reduced.

The rubbing treatment is implemented to the base plate 301 comprising the spacer members 304 and the insulating film 303, for instance, along stripe lines of the spacer members 304 with a cloth or a paper, etc. This rubbing treatment can provide a wall effect for orienting the liquid crystal preferentially in one direction with respect to side walls 306 and 307 of each spacer member 304. Accordingly, the side walls 306 and 307 thus rubbed can provide the wall effect for the orientation of the liquid crystal. In this instance, the liquid crystal 305 having bistability in contact with the side walls 306 and 307 is horizontally aligned or oriented in a direction parallel or substantially parallel to the base plate 301, i.e. in the rubbing direction ("homogeneous orientation"), since the insulating film 303 does not have a wall effect for preferentially orienting the liquid crystal or has only a weak wall effect, as described later.

As stated above, the insulating film 303 is formed by a material selected from materials having a hardness higher than that of the spacer members 304. Accordingly, even if the insulating film 303 is rubbed, the plane 308 thereof does not have a preferential direction for orienting the liquid crystal (in contact therewith) to a third, metastable, or strongly stable, state directed in one direction. However, when there are no side walls 306 and 307 to which the wall effect is given by the above-mentioned rubbing treatment (viz. there is no influence of the wall effect therearound), it is possible for the plane 308 to have a weak wall effect for horizontally orienting the liquid crystal in random directions. In this instance, it is preferable that a wall effect for vertically orienting a liquid crystal (homeotropic orientation) is not given to the plane 308. Further, the side walls 306 and 307 and the plane 308 thus rubbing treated may preferably be rinsed with acetone, etc. and thereafter subjected to a surface treatment using a horizontal alignment agent e.g. a silane coupling agent, a surface active agent for horizontal alignment, etc.

The optical modulation device according to the present invention is further provided with another base plate 309 arranged so as to overlap the above-mentioned base plate 301 in parallel therewith. On the base plate 309, an electrode group comprising a plurality of (signal) electrodes 310, and an insulating film 311 provided thereon are formed. The plurality of signal electrodes 310 and the other plurality of scanning electrodes 302 may be arranged and wired in a matrix arrangement, or may be formed in other forms, e.g. using an electrode wiring of seven segment structure. The insulating film 311, provided on the base plate 309 is not necessarily required. However, the provision of the insulating film 311 is useful for preventing electric currents from flowing into the liquid crystal layer. The insulating film 311 is formed with the same material as that of the above-mentioned insulating film 303. Similar to the insulating film 303, a plane 312 of the insulating film 311 does not have a preferential direction for orienting the liquid crystal in contact with the plane 312 to a third, metastable or strongly stable state directed in one direction. Accordingly, when side walls 306 and 307 to which the wall effect is given by the above-mentioned rubbing treatment are not provided.(viz. there is no influence of the wall effect therearound), a wall effect for effecting horizontal alignment of the liquid crystal in random directions is given to the plane 312. Therefore, when the insulating film 311 is formed of the same materials as that of the above-mentioned insulating film 303, it is possible to apply the above-mentioned rubbing treatment to the plane 312 as desired, whereas the rubbing treatment is not necessarily required.

The insulating film 311 may also be formed of materials other than those used in the above-mentioned insulating film 303. The examples of such materials include polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, resins, e.g. cellulose resin, melamine resin, urea resin, acrylic resin, etc., inorganic compounds, e.g. $SiO_2$ or $TiO_2$, etc. Further, the insulating film 311 may be rinsed with acetone, etc. and thereafter stacked upon the base plate 301, thus forming a pair of parallel base plates.

The optical modulation device according to the present invention may use a pair of polarizing means (a polarizer 313 and an analyzer 314) arranged on both sides of, i.e., sandwiching, the pair of parallel base plates 310 and 309. As the polarizer 313 and the analyzer 314, an ordinary polarizing plate or polarizing film is available, or a polarizing beam splitter may be used. In this instance, the polarizing means may be arranged in a cross nicol relationship or in a parallel nicol relationship.

The optical modulation device according to the present invention can be produced or obtained by hermetically injecting a ferroelectric liquid crystal between a pair of parallel base plates, the peripheries of which are sealed by an epoxy adhesive or a glass having low melting point, to form a cell, and gradually cooling, under precise temperature control, the cell which has been heated to give an isotropic phase. As a typical example, in the case of a compound (e.g. decyloxybenzylidene-P'-amino-2-methyl butyl cinnamate; DOBAMBC) which causes phase transition of isotropic phase → SmA-phase (smectic A phase) → SmC*- phase during the gradually cooling process, when the phase transition from the isotropic phase to the SmA phase is caused, there appears a growth of a monodomain in such a manner that liquid crystal molecules are arranged or oriented from the vicinity of side walls along the rubbing treatment direction due to the influence of the spacer members having side walls to which the wall effect has been previously given by the rubbing treatment. Thus, after the whole areas of the liquid crystal become monodomain regions, if temperature is further lowered, there occurs the phase transition from SmA-to SmC*-phase, whereby the alignment control is finished. In this state, the liquid crystal molecules are oriented in parallel with the side wall surfaces of the spacer members and in the rubbing treatment direction. Accordingly, they are placed in plane orientation with respect to the plane 308 of the insulating film 303. The crystal layer of SmC*-phase is formed perpendicular to the plane of the insulating film 303 and the stripes. As stated above, on the plane 308 of the insulating film 303, grooves are not formed by rubbing, thus giving no specific directional selectivity to the liquid crystal molecules within the plane thereof. Accordingly, when the optical modulation cell having characteristics stated above is operated as a device, bistability or high speed responsiveness is not damaged.

In another embodiment of the invention, there is provided an optical modulation device comprising a liquid crystal having bistability interposed between a pair of parallel base plates wherein a plurality of structural members are arranged at substantially equal distances between the pair of parallel base plates and in contact with at least one of the base plates; side walls of the plurality of structural members have been treated for horizontal alignment in parallel with the direction of extension thereof to have a wall effect for orienting liquid crystal molecules in the direction of horizontally aligning treatment; and surface portions of the parallel base plates not contacting the structural members are coated with an insulating film to suppress the wall effect due to the horizontally aligning treatment.

Such an optical modulation device may be produced by a method according to the present invention which comprises the steps of providing a pair of base plates, arranging a plurality of structural members having side walls on one of the pair of base plates at a substantially equal distance, implementing horizontal orientation treatment to the base plate having thereon the structural members thus arranged in the extending directions of the structural members, selectively forming insulating films at portions not having structural members on the base plate surfaces to which the horizontal alignment has been implemented, stacking and fixing the base plate having the structural members thus formed, with its face having the structural members inside, onto the other base plate of the pair of base plates so that they are stacked in parallel with each other, and hermetically inserting a liquid crystal having bistability between the pair of parallel base plates thus formed.

Figure 4B:
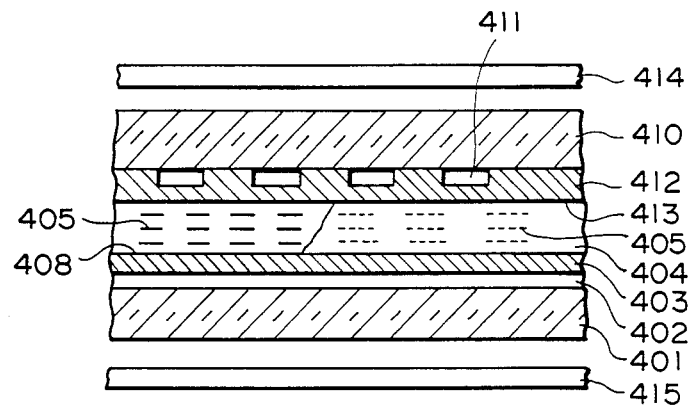
FIG. 4B shows a side cross sectional view of the optical modulation device shown in FIG. 4A.
Figure 4C:
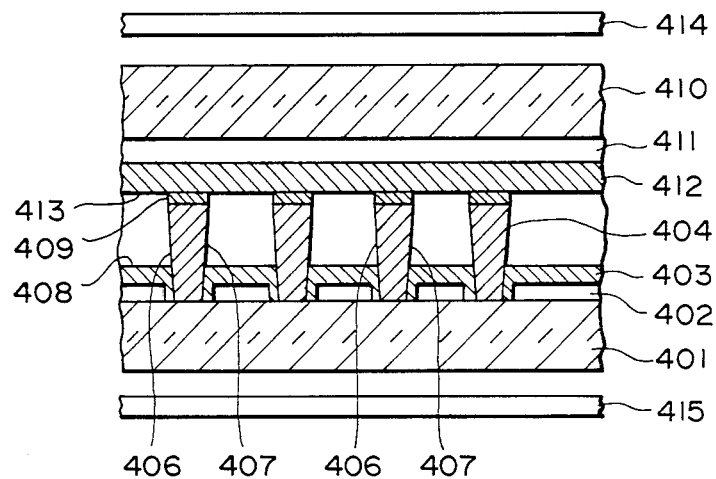
FIG. 4C shows a front cross sectional view of the optical modulation device shown in FIG. 4A.

FIGS. 4A to 4C show an embodiment of the above-mentioned optical modulation device, wherein FIG. 4A shows a perspective view, FIG. 4B a side cross sectional view and FIG. 4C a front cross sectional view. In FIG. 4A, the indication of a liquid crystal and polarizers is omitted.

In FIGS. 4A to 4C, a group of electrodes (e.g. a group of scanning electrodes) comprising a plurality of electrodes 402 are formed in a predetermined pattern by etching on a base plate 401 of glass, plastic, etc. Further, a plurality of stripe-shaped spacer members 404 formed in an arrangement of one after the other with and in parallel with these electrodes 402. In this example, the spacer members 404 are trapezoid-shaped in cross section as shown clearly in FIG. 4C. Further, an insulating film 403 is formed so as to cover the electrodes 402 except for portions on which spacer members 404 are formed on the base plate 401. In this example, an insulating film 409 is also formed on each head of the spacer members 404.

As materials of the spacer members 404, there may be used any materials which can be formed in dimensions described later and can give a wall effect through an horizontal orientation treatment, typicalri of rubbing. Usually, synthetic resins are preferably used. More particularly, these materials are selected from resins such as polyvinyl alcohol, polyimide, polyamide imide, polyester imide, polyparaxylylene, polyester, polycarbonate, polyvinyl acetatal, polyvinyl chloride, polyvinyl acetate, polyamide, polystyrene, cellulose resin, melamine resin, urea resin, acrylic resin, etc., cyclic rubber photoresist, phenol novolac photoresist, electron beam photoresist (polymethyl-methacrylate, epoxidized-,4-polybutadiene), etc.

On the other hand, the function of the insulating film 403 is essentially to prevent electric currents from flowing into the layer of the liquid crystal 405 having bistability. In this embodiment, however, the insulating film provides a significant effect of suppressing the effect of the horizontal orientation treatment implemented to the electrode surfaces to form a monodomain structure of the liquid crystal. The insulating film 403 and the insulating film 409 may be formed with compounds, e.g. silicon monoxide, silicon dioxide, aluminum oxide, zirconia, magnesium fluoride, cerium oxide, cerium fluoride, silicon nitride, silicon carbonate, boron nitride, etc. Another effect of the insulating film 403 is to prevent of electric currents produced by a slight amount of impurities contained in the liquid crystal layer. Accordingly, even if a device is repeatedly operated, deterioration of the liquid crystal compound is prevented.

The thickness of the insulating film 403 (as well as the insulating film 409) is usually set similarly as with the above-mentioned insulating film 303 or 311. The liquid crystal layer 405 may have the same thickness as the liquid crystal layer 305. The space members 404 may have the same width and may be disposed at the same distances as spacer members 304.

These spacer members 404 may be formed so that they have certain patterns and dimensions using various kinds of printing methods, e.g. the screen printing, etc., or preferably using the photolithographic technique, or the electron beam lithographic technique, etc.

In this embodiment, a wall effect due to the horizontal alignment is selectively given to the side walls of the spacer members 404. For realizing this, prior to the stage of the formation of the insulating film 403, rubbing treatment is first applied to the base plate 401 on which spacer members 404 are formed in the extending direction of the spacer members using velvet, cloth, paper, etc. This rubbing treatment makes it possible to give a wall effect for selectively orienting the liquid crystal in one direction. Such a horizontal alignment also gives a wall effect to the exposed surfaces of the electrodes 402 corresponding to portions between the spacer members 404 provided on the base plate 401. However, the wall effect produced at the exposed surfaces of the base plate can be removed by subsequently forming the insulating film 403 thereon. In this instance, in order to prevent the insulating films from being formed on the side walls 406 and 407 of the spacer members, thereby lowering the wall effect, and in view of the fact that the insulating film is formed by vapor deposition, it is preferable that the spacer members have a sectional shape of a trapezoid as shown in FIG. 4C. Namely, spacer members trapezoid shaped in cross section are disposed on the base plate 401 through the narrow width surfaces thereof. Such a trapezoid shape can be obtained by over-etching the spacer members through appropriate selection of conditions, such as contrast of resists, development time, etc., when spacer members are formed by the photolithographic technique. It is preferable that an inclined angle of each side surface of the trapezoid with respect to a vertical line is larger than 10°.

Thus, even after the formation of the insulating film, the side walls 406 and 407, treated for horizontal alignment, can selectively maintain the wall effect of orienting the liquid crystal. Because the insulating film 403 does not have the wall effect for selectively orienting the liquid crystal or only has a weak wall effect, the liquid crystal 405 having bistability in contact with these side walls 406 and 407 is horizontally oriented (homogeneously oriented) in parallel or substantially parallel with the base plate 401, namely, e.g. in the rubbing direction.

The optical modulation device according to the present invention is provided with another base plate 410 which is overlaid above and in parallel above-mentioned base plate 401. On the base plate 410, an electrode group comprising a plurality of electrodes (e.g. signal electrodes) and an insulating layer 412 thereon are formed successively. The plurality of (signal) electrodes 411 and the other plurality of (scanning) electrodes 402 may be disposed and wired in a matrix arrangement. The insulating film 412 provided on the base plate 410 is not necessarily required. However, it is useful for preventing electric currents from flowing into the liquid crystal layer. The insulating layer 412 is formed of the same material as that of the above mentioned insulating film 403.

The insulating film 412 may also be formed of materials other than those used in the above-mentioned insulating layer 403. These materials include resins such as polyvinyl alcohol, polyimide, polyamide imide, polyester imide, polyparaxylylene, polyvinyl chloride, polyvinyl acetate, polyamide, polystyrene, cellulose resin, melamin resin, urea resin, acrylic resin, etc., inorganic compounds such as $SiO$, $SiO_2$ or $TiO_2$, etc.

The optical modulation device according to the present invention may use a pair of polarizing means (a polarizer 414 and an analyzer 415) provided on both sides of the pair of parallel base plates 401 and 410, i.e., between which the base plates are interposed.

The optical modulation device according to this embodiment can be produced by the process described above in connection with the embodiment of FIG. 3.

The optical modulation device according to the present invention has been explained in accordance with a preferred embodiment thereof. However, it is easily understood that the above-mentioned embodiment can be modified within the scope of the invention. For instance, in the example stated above, the rubbing treatment has been principally explained, which can be in fact considered as a particularly preferable horizontal alignment in the present invention. However, as long as a relatively strong alignment effect can be given to the side walls, other horizontally aligning treatments, e.g. SiO vapor deposition, or coating of a relatively strong horizontal alignment agent may be employed. Further, if the members which have been explained as the spacer members 404 have a side wall for giving a necessary wall effect, it is not necessarily required that they are in contact with both base plates and serve as spacer members. However, as seen from the above-mentioned example, the spacer member is an example of a preferable structure member. Moreover, the electrodes are not limited to the simple stripe-shaped matrix electrodes. They may be formed with an electrode arrangement having other shapes, such as a seven segment structure. Similar to the electrodes, it is not limited that the spacer members 404 is stripe-shaped. Namely, as long as they are arranged in a manner that the distances therebetween are not extremely different from each other, and can give a substantially equal wall effect with respect to the liquid crystal, they can be shaped in other forms.

As a still another embodiment, there is provided an optical modulation device comprising a liquid crystal having bistability interposed between a pair of parallel base plates, wherein a plurality of structure members provided with side walls are arranged at substantially equal distances between the pair of electrode plates and in contact with at least one of the plurality of base plates; the side walls of the plurality of structure members are treated for horizontal orientation in parallel with the extending direction thereof to have a wall effect for orienting liquid crystal molecules in the direction of the horizontal orientation treatment; surface portions of the base plates not contacting the structure members are coated with an insulating film of which surfaces are treated by etching to suppress the wall effect due to horizontal orientation treatment.

Such an optical modulation device may be produced by a method according to the present invention which comprises the steps of providing a pair of base plates, forming an insulating film on one of the pair of base plates, arranging a plurality of structural members provided with side walls at substantially equal distances to each other on the insulating film, applying a horizontal orientation treatment to the electrode plate surfaces on which the structure members are thus arranged in the extending direction of the structure members, etching the insulating film existing between structural members provided on the base plate surface thus treated for horizontal orientation, stacking the base plate (having the structural members with its face having the structural members inside) on the other plate of the pair of base plates to fix both base plates so that they are stacked in parallel with each other, and hermetically inserting a liquid crystal having bistability between the pair of parallel base plates thus obtained.

Figure 5B:
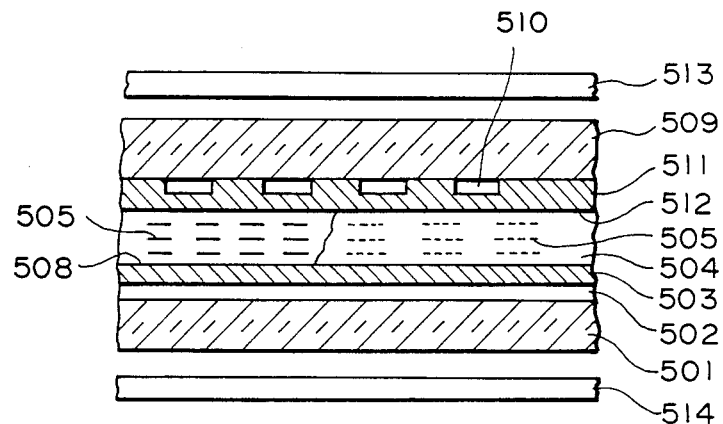
FIG. 5B shows a side cross sectional view of the optical modulation device shown in FIG. 5A.
Figure 5C:
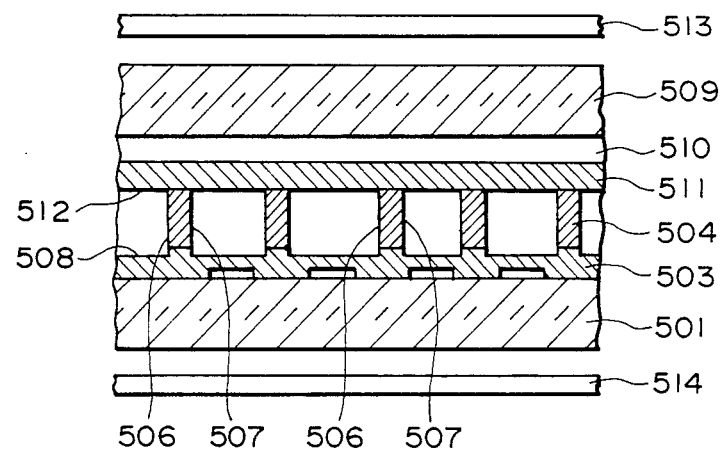
FIG. 5C shows a front cross sectional view of the optical modulation device shown in FIG. 5A.

FIGS. 5A to 5C show an embodiment of the above-mentioned optical modulation device wherein FIG. 5A is a perspective view, FIG. 5B a side cross sectional view, and FIG. 5C a front cross sectional view. In FIG. 5A, the indication of a liquid crystal and polarizers is omitted.

In FIGS. 5A to 5C, on a base plate 501 of glass or plastic, an electrode group (e.g. scanning electrodes) comprising a plurality of electrodes 502 is formed by etching, etc. so as to give a predetermined pattern (in this example, stripe shape). Further, an insulating film 503 is formed so as to cover such electrodes 502, and a plurality of stripe-shaped spacer members 504 are formed and arranged thereon one after the other and in parallel with electrodes 502.

The insulating film 503 may be formed of the same compounds as the above described insulating film 403, and may also have the same thickness.

The spacer member 504 may be composed of materials satisfying the conditions that they can be formed into desired dimensions referred to later, that the wall effect can be given thereto by horizontal orientation treatment, e.g. typically rubbing, and that they have a durability with respect to the etching referred to later. Usually, synthetic resin materials may preferably be used. More particularly, a material for the spacer member is selected from, e.g., resins such as polyvinyl alcohol, polyimide, polyamide imide, polyester imide, polyparaxylylene, polyester, polycarbonate, polyvinyl acetal, polyvinyl chloride, polyvinyl acetate, polyamide, polystyrene, cellulose resin, melamin resin, urea resin, acrylic resin, photosensitive polyimide, photosensitive polyamide, cyclic rubber photoresist, phenol novolac photoresist and electron beam photoresist (polymethyl metacrylate, epoxidized 1,4-polybutadiene, etc.).

The width of, and the distance between, the spacer members 504 is usually set as with the above-mentioned spacer members 304.

In accordance with the present invention, a wall effect due to the horizontal orientation treatment is selectively given to the side walls of the spacer members 504. To realize this, after the formation of the electrodes 502, the insulating film 503 and the spacer members 504 on the base plate 501 on which spacer members are formed, rubbing treatment is applied by using, e.g., velvet, cloth, paper, etc. in the extending directions of the spacer members. Such a horizontal orientation treatment provides the wall effect of aligning the liquid crystal selectively in one direction to the side walls 506 and 507 of the spacer members 504. The wall effect is also given to the exposed surface of the insulating film 503 corresponding to portions between the spacer members 504 of the base plate 501. However, the wall effect given to the insulating film is eliminated by subsequently selectively etching the insulating film 503.

For the etching treatment, a dry or wet etching is effected by using a gaseous etchant or a liquid etchant such as acid, alkali, etc. each capable of selectively etching the insulating film material without spoiling the material of the spacer members stated above. It is sufficient in this step to etch extremely slightly the surface layer of the insulating film 503. For instance, when horizontal orientation treatment is effected by rubbing, in general it is sufficient to etch about 30 Å or more, although the thickness to be etched can change depending on other conditions, i.e., if the insulating material is hard, it is sufficient that a small thickness thereof is etched.

The side walls 506 and 507 thus treated for horizontal orientation can selectively maintain the wall effect with respect to the alignment of the liquid crystal, even after the etching treatment. Since the insulating film 503 has no wall effect for selectively aligning the liquid crystal, or only has a weak wall effect, the liquid crystal 505 having bistability in contact with these side walls 506 and 507 is horizontally aligned (homogeneously aligned) in parallel with or substantially in parallel with the base plate 501, i.e. in the direction of horizontal orientation treatment.

The optical modulation device of this embodiment is provided with the other base 509 stacked in parallel with the above-mentioned base plate 501. On the base plate 509, an electrode group comprising a plurality of electrodes (e.g. signal electrodes) 510 are formed, and an insulating film 511 is further formed thereon. The plurality of (signal) electrodes 510 and the other plurality of (scanning) electrodes 502 may be dispersed and wired in a matrix arrangement. The insulating film 511 provided on the base plate 509 is not necessarily required, while it is useful for preventing electric currents from flowing in a liquid crystal layer. Further, the insulating film may also be formed of the same material as that of the above-mentioned insulating film 503. The insulating film 511 and the plane 512 thereof are substantially the same as those of the insulating film 411 and the plane 412 of the embodiment shown in FIGS. 4.

A pair of parallel base plates are formed by oppositely arranging the base plate 509 formed with the insulating film 503 rinsed with acetone and the base plate 501 so that they are stacked with each other.

The optical modulation device according to this embodiment may use a pair of polarizing means (a polarizer 513 and an analyzer 514 on the both sides of the pair of parallel base plates 501 and 509, i.e. between which the base plates 501 and 509 are interposed. The polarizer 513 and the analyzer 514 are substantially the same as the polarizer 413 and the analyzer 414 of the embodiment shown in FIG. 4.

The optical modulation device according to this embodiment shown in FIG. 5 can be prepared by using the above explained members and following otherwise the manner explained with reference to the embodiment shown in FIG. 4.

Moreover, modifications explained with reference to the embodiment shown in FIG. 4 are also applicable to the embodiment shown in FIG. 5.

Figure 6:
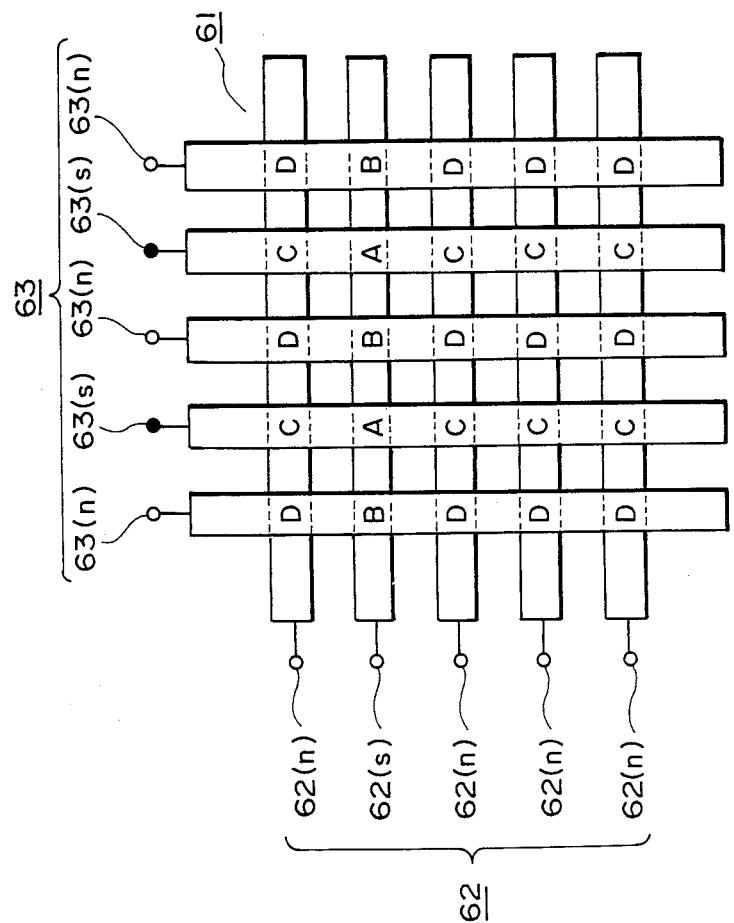
FIG. 6 is a plan view schematically illustrating an electrode arrangement of an optical modulation device according to the present invention.

FIGS. 6 to 8 show an example of a driving method for the optical modulation device according to the present invention.

Figure 7A:
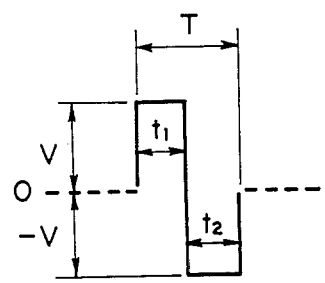
FIGS. 7A to 7D are respectively waveforms illustrating signals for driving an optical modulation device according to the present invention.
Figure 7C:
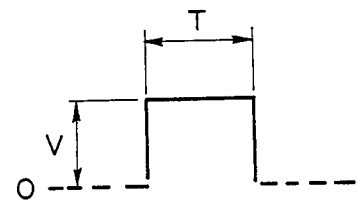
Figure 7B:
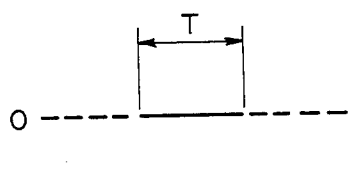
Figure 7D:
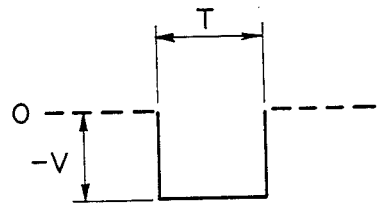
Figure 8A:
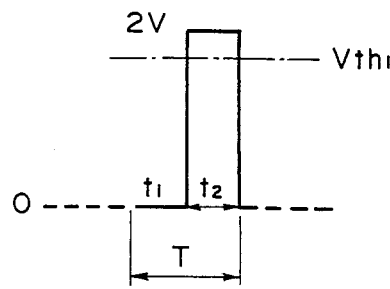
FIGS. 8A to 8D are respectively waveforms showing voltages applied to picture elements.
Figure 8C:
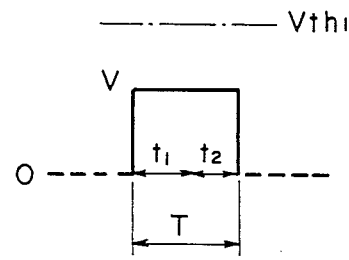
Figure 8B:
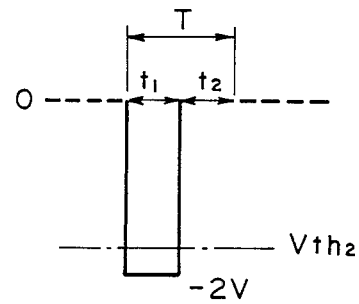
Figure 8D:
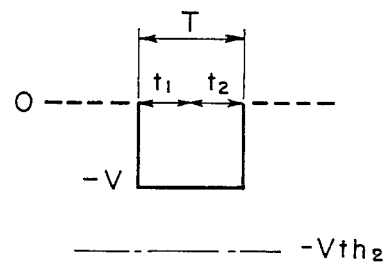

FIG. 6 is a view schematically showing a cell 61 having a matrix electrode arrangement between which a ferroelectric liquid crystal compound is interposed. Reference numerals 62 and 63 denote a group of scanning electrodes and a group of signal electrodes, respectively. FIGS. 7A and 7B show electric signals applied to a selected scanning electrode 62(s) and other scanning electrodes (nonselected scanning electrodes) 62(n), respectively. FIGS. 7C and 7D show electric signals applied to selected signal electrodes 63(s) and nonselected signal electrodes 63(n), respectively. In FIGS. 7A to 7D, the abscissa and the ordinate represent time and voltage, respectively. For instance, when a motion picture is displayed, a scanning electrode is sequentially and periodically selected from the group of scanning electrodes 62. Here, threshold voltage for a first stable state of a liquid crystal having bistability is represented by $V_{th1}$, and a threshold voltage for a second stable state thereof by $-V_{th2}$. The electric signal applied to the selected scanning electrode 62(s) is an alternating voltage of V and $-V$ at phases (times) of $t_1$ and $t_2$ respectively, as shown in FIG. 7A. The other scanning electrodes 62(n) are grounded, thus resulting in a zero volt electric signal. On the other hand, electric signals applied to the selected signal electrodes 63(s) have voltages of V as shown in FIG. 7C, while those applied to the non selected signal electrodes have voltages of $-V$, as shown in FIG. 7D. The voltages of V and $-V$ are set to desired values satisfying the following relationships, $V < V_{th1} < 2V$, and $V > V_{th2} > 2V$.

Voltage waveforms applied to respective picture elements, when such electric signals are given, are shown in FIG. 8. Voltage waveforms shown in FIGS. 8A to 8D correspond to those applied to picture elements A, B, C and D shown in FIG. 6, respectively. Thus, as seen from FIG. 8, a voltage of 2 V above the threshold voltage $V_{th1}$ is applied to the picture elements A on the selected scanning line at a phase of $t_2$. In contrast, a voltage of 2 V below the threshold voltage $-V_{th2}$ is applied to the picture elements B at a phase of $t_1$. Accordingly, the orientation of liquid crystal molecules is determined depending upon whether a signal electrode is selected on the selected scanning electrode line, or not. Namely, when a signal electrode is selected, the liquid crystal molecules are oriented to the first stable state. To the contrary, when not selected, they are oriented to the second stable state. In either case, the orientation is not related to the previous state of each picture element. On the other hand, voltages applied to all picture elements C and D on the non-selected scanning lines are V and $-V$, respectively, either of which is (not) above the threshold voltage in terms of the absolute value. Accordingly, the liquid crystal molecules corresponding to picture elements C and D maintain the orientation corresponding to the signal state when last scanned without changing the oriented state. Namely, when a certain scanning electrode is selected, signals assigned to the one line of the selected scanning line are written. During a time interval from a time at which the scanning of one frame is completed to a time at which a subsequent line is selected, the concerned signal state can be maintained. Accordingly, even if the number of scanning electrodes increases, the duty ratio does not substantially change, resulting in no possibility of lowering of contrast and occurrence of crosstalk, etc. In this instance, the value of the voltage V and time width of the phase of $(t_1 + t_2) = T$ are usually set to ranges of 3 volts to 70 volts and of 0.1 $\mu$sec. to 2 $\mu$sec., respectively, although they depend upon the thickness of a liquid crystal material or a cell used. Accordingly, in this case, electric signals applied to a selected scanning electrode cause the transition from the first stable state (referring to "bright" state when they are converted into optical signals) to the second stable state (referring to "dark" state when converted into optical signals), or vice versa.

Figure 9:
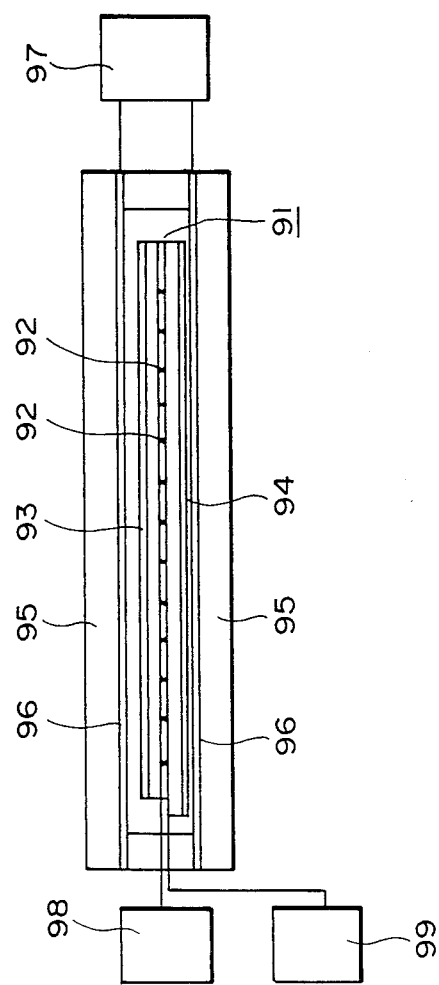
FIG. 9 is a cross sectional view illustrating a still further embodiment of an optical modulation device according to the present invention.

FIG. 9 shows another preferable embodiment of the optical modulation device according to the present invention. A liquid crystal cell 91 similar to those shown in FIGS. 3 to 5 is arranged in a liquid crystal display device for displaying a motion picture shown in FIG. 9. On both sides of the liquid crystal cell 91, linear polarizers 93 and 94 are arranged in a cross nicol relationship. Behind the linear polarizer 94, a reflective member (preferably, aluminum vacuum deposition film or matted aluminum vacuum deposition film forming an irregular reflective member) may be arranged.

The liquid crystal cell thus constructed is sandwiched between a pair of glass plates 95 provided with NESA films 96. By flowing electric currents through the NESA films 96 with a heating power supply 97, it is possible to effect a temperature control of the liquid crystal cell 91. In this instance, the liquid crystal cell 91 can be satisfactorily operated by electric signals applied to a scanning signal source 98 and an information signal source 99. In the figure, reference numeral 92 denotes a spacer member.

Examples of actual production of an optical modulation device according to the invention will be explained.

EXAMPLE 1

A film of silicon carbide containing hydrogen (SiC:H) was formed on a glass base plate on which stripe shaped pattern electrodes had been formed with ITO (Indium Tin Oxide) by the plasma CVD (Chemical Vapor Deposition) process as stated below. The glass base plate having the pattern electrodes was placed on the anode side of a plasma CVD device of parallel plate electrode type. The system was evacuated and the glass plate was heated to 200° C. Then, $SiH_4$ gas and $CH_4$ gas were introduced into a reactor under control such that their flow volumes were 10 sccm and 300 sccm, respectively. The gas pressure was about 0.2 Torr. Then, a high frequency power supply of 13.56 MHz was turned on to apply a voltage on the cathode side of the parallel plate electrodes. thereby causing a glow discharge to start a reaction. After reacting for about 10 min., a film of SiC:H having the thickness of about 2000 Å was formed on the base plate.

Then, a polyimide forming solution ("PIQ" manufactured by Hitachi Kasei Kogyo K.K., non-volatile matter content of 14.5 wt%) was coated on the film of SiC:H in 10 sec. with a spinner coater rotating at 3000 r.p.m. and thereafter heated at a temperature of 120° C. for 30 min. to form a coating having a thickness of $2\mu$.

Then, a positive-type resist solution ("AZ 1350" manufactured by Shipley Company, Ltd.) was spinner coated to the resultant coating and prebaked. The resist layer was exposed to light through a stripe-shaped mask having a masking width of 8 $\mu$ and an interval thereof of 100 $\mu$. Then, by developing the resist with a developer "MF 132" containing tetramethyl ammonium hydroxide, the resist film of the exposed portion and the polyimide film located therebelow were etched to form throughholes. After the base plate thus treated was washed and dried, the resist film of non-exposed portions was removed with methylethyl ketone. Thereafter, the polyimide film was cured by heating at 200° C. for 60 min. and at 350° C. for 30 min. to form a spacer layer of PIQ (Polyimide isoindoloquinazolinedione).

Then, the base plate was rubbed with a cloth in the arrangement direction of the stripe shaped members and washed successively by water and acetone. After being dried, the base plate was immersed in 1 % aqueous solution of a silane coupling agent ("KBM 403" manufactured by Shinetsu Kagaku Kogyo K.K.) pulled up therefrom and heat dried to form an electrode plate A.

Then, similar to the producing method stated above, a film of silicon carbide is provided on a glass base plate on which stripe pattern electrodes had been formed with ITO. The base plate having pattern electrodes were then treated with a silane coupling agent, thus producing an electrode plate B. The electrode plates A and B were arranged so that their stripe pattern electrodes overlapped perpendicularly to each other to form a cell structure, and DOBAMBC was heated to form an isotropic phase and hermetically inserted into the cell. Then, the cell thus formed was gradually cooled to produce a monodomain liquid crystal device.

EXAMPLE 2

A device was produced by the same method as that of the Example 1 except that $NH_3$ gas was used instead of $CH_4$ gas when an insulating film was formed and the plasma reaction time was 5 min. The thickness of the insulating film was about 1500 Å.

EXAMPLE 3

A zirconia film was formed on a glass plate on which stripe shaped pattern electrodes had been formed with ITO in accordance with the following procedure.

Base plates and sintered zirconia were placed within an electron beam vacuum deposition apparatus, which was evacuated to a pressure less then $1 \times 10^{-6}$ Torr. Then, the sintered zirconia was melted and vaporized by an electron beam under conditions of an accelerating voltage of 10 KV and a filament current of 70 mA to form a film of zirconia of about 1000 Å in about 10 min.

The base plate on which the zirconia film was formed was then treated in the same manner as in the Example 1 were employed to produce a device.

When signals were applied to scanning and signal electrodes respectively of the liquid crystal display devices produced in accordance with Examples 1 to 3, a good motion display was obtained in each case.

EXAMPLE 4

A film of zirconia was formed on a glass base plate having stripe shaped pattern electrodes of ITO (Indium Tin-Oxide) as follows.

Base plates and sintered zirconia were placed within an electron beam vacuum deposition device which was then evacuated to a pressure of less than $1 \times 10^{-6}$ Torr. Then the sintered zirconia was melted and vaporized by an electron beam under conditions of an accelerating voltage of 10 KV and a filament current of 70 mA to form a film of zirconia having a thickness of about 1000 Å in about 10 min.

Then, the base plate was immersed in a 1 % aqueous solution of a silane coupling agent ("KBM 403" manufactured by Shinetsu Kagaku Kogyo K.K.), pulled up therefrom and heat-dried to produce an electrode plate A. On the glass base plate having the stripe shaped pattern electrodes of ITO, a polyimide forming solution ("PIQ" manufactured by Hitachi Kasei Kogyo K.K., non volatile matter content of 14.5 wt%) was coated with a spinner coating machine rotating at 3000 r.p.m. for 10 min. and then heated at a temperature of 120° C. for 30 min., thus forming a film having a thickness of 2 $\mu$. Then, a positive type resist solution ("AZ 1350" manufactured by Shipley Company, Ltd.) was spinner-coated on the coating and prebaked. The resist layer was exposed to light through a mask having a masking width of 8 $\mu$ and a pitch of 100 $\mu$. Then, by developing the coating thus exposed with a developer "MF 312" containing tetramethyl ammonium hydroxide, the resist layer of the exposed portion and the film of polyimide located therebelow were etched, thereby to form through holes. After the article was washed and dried, the resist film of the unexposed portion was removed with methyl ethyl ketone. Thereafter, the polyimide was cured by heating at 200° C. for 60 min. and at 350° C. for 30 min. to form spacer layers of PIQ.

With a scanning type electron microscope, it was confirmed that the spacer was inverse tropezoid-shaped in which its side surfaces were inclined at about 12° from vertical.

Then the base plate was rubbed with a cloth in the arrangement direction of the stripe-shaped spacer and washed successively with water and acetone. After being dried, a film of zirconia was provided thereon as mentioned and further treated with a silane coupling agent, whereby an electrode plate B was produced.

The electrode plates A and B were arranged so that their stripe shaped pattern electrodes overlapped perpendicular to each other to form a cell and DOBAMBC was heated until it formed an isotropic phase and was hermetically inserted into the cell. Then, by gradually cooling the cell thus formed, a desired monodomain liquid crystal device was produced.

EXAMPLE 5

A film of silicon dioxide as an insulating film was formed as follows.

Base plates and a solid material of silicon dioxide were placed within an electron beam vacuum deposition device which was then evacuated to a pressure below $1 \times 10^{-6}$ Torr. Then, the solid material of silicon oxide was melted and vaporized by an electron beam under conditions of an accelerating voltage of 10 KV and a filament current of 100 mA to form a film of silicon dioxide having a thickness of about 1000 A in 10 min. Subsequent thereto, the same procedures as in the Example 4 were employed to produce a desired device.

EXAMPLE 6

A film of cerium oxide as an insulating film was formed as follows. Base plates and a solid material of cerium oxide were placed within an electron beam vacuum deposition device, which was then evacuated to a pressure of less than $1 \times 10^{-6}$ Torr. Then, the solid material of cerium oxide was melted and vaporized by an electron beam under conditions of an accelerating voltage of 10 KV and a filament current of 100 mA to form a film of oxide cerium having a thickness of about 1000 A.

Subsequent thereto, the same procedures as in the Example 4 were employed, whereby a desired device was obtained.

When signals were respectively applied to scanning and signal electrodes of the liquid crystal display devices produced in Examples 4 to 6, an excellent motion display was obtained.

EXAMPLE 7

A film of silicon dioxide was formed on a glass plate having stripe shaped pattern electrode of ITO as follows. Base plates and a solid material of silicon dioxide were placed within an electron beam vacuum deposition device, which was then evacuated to a pressure of less than $1 \times 10^{-6}$ Torr. Then, the solid material of silicon dioxide was melted and vaporized by an electron beam under conditions of an accelerating voltage of 10 KV and a filament current of 110 mA to form a film of silicon dioxide having a thickness of about 3000 A in about 10 min.

Then, a solution of a negative type resist of phenol resin ("Raycast RD 000N" manufactured by Hitachi Kasei Kogyo K.K.) was coated on the film of silicon dioxide with a spinner coating machine rotating at 3000 r.p.m. and then heated at a temperature of 80° C. for 20 min. to form a coating having a thickness of about $2\mu$. The resist layer was exposed to light through a mask having a masking width of 8 $\mu$ and a pitch of 100 $\mu$. Then the base plate was immersed and the resist was developed with a developer ("RD DEVELOPER" manufactured by Hitachi Kasei Kogyo K.K.) at a temperature of 25° C. for 70 sec. The base plate was then immersed in distilled water for 30 sec. and dried for 5 min. Then, the base plate was immersed into a postrinse solution ("RD-POSTRINSE" manufactured by Hitachi Chemical Company, Ltd.) at a temperature of 23° C. for one minute, and heated at a temperature of 140° C. for 20 min. to form a spacer layer.

Then, the base plate was rubbed with a cloth in the arrangement direction of the stripe shaped spacers, rinsed successively with water and acetone and dried.

Then, the base plate thus formed was set in a reactive spattering etching device of parallel plate type having a diameter of 200 mm$\phi$ and an interval of 40 mm. The base plate was etched for 5 min. in the atmosphere of $CF_4/H_2$, mixture gas ($H_2$ 20%) flowing at a volume rate of 23 sccm under conditions of a pressure of 0.3 Torr, an RF frequency of 13.56 MHz and an RF power of 200 W. The thickness of the film of silicon dioxide after etching was approximately 2500 A. Then, the base plate thus etched was immersed in a 0.5% solution in toluene of a silane coupling agent ("SH6040" manufactured by TORAY K.K.), pulled up therefrom and heat dried to produce an electrode plate A.

Then, similar to the above-mentioned producing method, a film of silicon oxide having a thickness of 200 A was provided on a glass base plate having stripe-shaped pattern electrodes of ITO thereon and further treated with a silane coupling agent, thus producing an electrode plate B.

The electrode plates A and B were arranged so that their stripe shaped pattern electrodes overlapped perpendicular to each other to form a cell, and DOBAMBC was heated to form an isotropic phase and hermetically inserted into the cell. Then, the cell was gradually cooled, thus producing a monodomain liquid crystal device.

EXAMPLE 8

Similar to the Example 7, a film of silicon dioxide having a thickness of 3000 A was formed on a glass base plate formed with stripe shaped pattern electrodes of ITO.

Then, a resist solution of chlorinated polystyrene ("JSR MES U" manufactured by Nippon Gosei Gomu K.K.) was coated on the base plate thus formed in 30 sec. and dried at a temperature of 90° C. for 30 min., thus forming a coating having a thickness of 1.3 $\mu$. Then the resist was exposed to light through the mask used in the Example 7. The base plate with the resist thus exposed was immersed and developed for 70 sec. with a developer ("JSR VD 100" manufactured by Nippon Synthetic Rubber Company, Ltd.). The base plate thus developed was rinsed and heated at 120° C. for 30 min., thus forming stripe-shaped spacer layers. Subsequent thereto, the same procedures as in Example 7 were repeated to produce a desired device.

EXAMPLE 9

A film of silicon nitride was formed on a glass base plate having stripe-shaped pattern electrodes of ITO thereon by the CVD process as follows.

The glass base plate was set on the anode side in a plasma CVD device of parallel plate electrode type, which has evacuated and heated so that the electrode temperature became 200° C. Then, SiH gas and $NH_3$ gas were introduced into a reactor at volume rates of 10 sccm and 300 sccm, respectively, under control. The gas pressure within the reactor was about 0.2 Torr. Then, a high frequency power supply of 13.56 MHz was turned on to apply a voltage on the cathode side of the parallel plate electrode thereby to cause a glow discharge to start a reaction. Through the reaction for about 8 min., a film of silicon nitride having a thickness of about 2500 A was formed on the base plate.

Then, spacer layers were formed on the film of silicon nitride similar to the Example 7.

The base plate having the silicon nitride film was subjected to the reactive sputtering under the same conditions as in Example 7 except that the reaction time of 3 min. was adopted, whereby a film of silicon nitride having the thickness of about 1800 A was obtained.

Subsequent thereto, the same procedures as in Example 7 were employed to produce a desired device.

When signals were applied to scanning and signal electrodes of the liquid crystal display device produced in Examples 7 to 9, an excellent motion display was obtained.

What is claimed is:

1. An optical modulation device comprising chiral smectic liquid crystal between a pair of parallel base plates oppositely spaced from each other, said chiral smectic liquid crystal forming a plurality of molecular layers substantially perpendicular to said pair of parallel base plates, wherein:
   at least one of said pair of parallel base plates is provided with a first coating and a socond coating, the first coating having a unidirectional orientation effect for orienting the liquid crystal molecules preferentially in one direction, and the second coating being disposed on the first coating for orienting the liquid crystal molecules substantially parallel to said base plates and suppressing the unidirectional orientation effect of the first coating, said unidirectional orientation effect being provided by rubbing or oblique vapor deposition;
   at least one of said pair of parallel base plates is provided with a plurality of ridges arranged in striped form with a pitch of from 10 microns for 2 mm so as to extend in one direction and having side walls with a wall effect for orienting the liquid crystal molecular layers substantilly perpendicular to the direction in which said redges extend,
   the chiral smectic liquid crystal is placed in a non-spiral structure even in the absence of an electric field to provide a bistability condition wherein the liquid crystal molecules are oriented to either one of a first state and a second state thereof, and
   said ridges include a bar of trapezoid-shape in cross section.

2. An optical modulation device according to claim 1, wherein said unidirectional orientation effect has been provided by rubbing.

3. An optical modulation device according to claim 1, wherein said ridges serve as spacer members between said base plates.

4. An optical modulation device according to claim 1, wherein said ridges are arranged linearly and substantially in parallel with each other.

5. An optical modulation device according to claim 1, wherein said liquid crystal having chiral smectic phase is a liquid crystal having a C- or H- phase.

6. An optical modulation device comprising chiral smectic liquid crystal between a pair of parallel base plates oppositely spaced from each other, wherein said chiral smectic liquid crystal is in a non-spiral structure and forms a plurality of molecular layers substantially perpendicular to said pair of parallel base plates, the plurality of perpendicular molecular layers being arranged along one normal of said molecular layers; and
   at least one of said pair of parallel base plates is provided with a coating which has been treated to have a unidirectional orientation effect for orienting the liquid crystal molecules preferentially in one direction and then treated to suppress unidirectional orientation effect leaving a weak unidirectional alignment on said plate, said unidirectional orientation treatment being provided by rubbing or vapor deposition;
   at least one of said pair of parallel base plates is provided with a plurality of ridges arranged in a stripe form with a pitch of from 10 microns to 2 mm so as to extend in one direction and having side walls with a wall effect for irienting the liquid crystal molecule layers substantially perpendicular to the direction in which said ridges extend, and
   the chiral smectic liquid crystal is placed in a non-spiral even in the absence of an electric field to provide a bistability condition wherein the liquid crystal molecules are oriented to either one of a first state and a second state thereof.

7. An optical modulation device according to claim 6, wherein said unidirectional orientation treatment is provided by rubbing.

8. An optical modulation devide according to claim 6, wherein said unidirectional orientation effect of the coating has been suppressed by etching.

9. An optical modulation device according to claim 6, wherein ridges in stripe form are disposed between said pair of parallel base plates and integrally with one of said pair of base plates.

10. An optical modulation device according to claim 6, wherein said ridges are in contact with both of said pair of parallel base plates and serve as spacer members.

11. An optical modulation device according to claim 6, wherein said liquid crystal having a chiral smectic phase is a liquid crystal having a C- or H- phase.

12. An optical modulation device comprising a chiral smectic liquid crystal between a pair of parallel base plates oppositely spaced from each other, wherein
   said chiral smectic liquid crystal is in a non-spiral structure and forms a plurality of molecular layers substantially perpendicular to said pair of parallel base plates, the plurality of perpendicular molecular layers of the chiral smectic liquid crystal being arranged along one normal of said molecular layers; and
   at least one of said pair of parallel base plates having a coating formed on the base plate and a plurality of ridges thereon arranged in stripe form with a pitch of from 10 microns to 2 mm so as to extend in one direction, said coating formed on the base plate having a higher hardness than that of said ridges, said ridges and said coating having a unidirectional orientation treatment provided by rubbing or vapor deposition.

13. An optical modulation device according to claim 12, wherein said rideges serve as spacers between said pair of parallel base plates.

14. An optical modulation device according to claim 12, wherein the thickness of said ridges arranged in a stripe form is 0.5 $\mu$ to 50 $\mu$.

15. An optical modulation device according to claim 12, wherein said ridges are formed of a coating of synthetic resin.

16. An optical modulation device according to claim 15, wherein said synthetic resin is at least one of resins selected from the group consisting of polyvinyl alcohol, polyamides, polyamide imides, polyester imides, polyparaxylylene, polyester, polycarbonate, polyvinyl acetal, polyvinyl chloride, polyvinyl acetate, polyamides, polystyrene, cellulose resin, melamine resin, urea resin, acrylic resins, photosensitive polyimides, photosensitive polyamides, cyclic rubber photoresists, and electron beam photo resists.

17. An optical modulation device according to claim 12, wherein said ridges are formed of a coating of an insulating material.

18. An optical modulation device according to claim 17, wherein said insulating material is a material selected from the group consisting of silicon nitride, silicon nitride containing hydrogen, silicon carbonate, silicon carbonate containing hydrogen, boron nitride, boron nitride containing hydrogen, cerium oxide, silicon oxide, aluminum oxide, zirconia, and magnesium fluoride.

19. An optical modulation device according to claim 12, wherein polarizing means are arranged on the sides of said pair of parallel base plates, respectively.

20. An optical modulation device according to claim 19, wherein said pair of parallel base plates are respectively provided with a group of electrodes, and means for applying an electric field between the groups of electrodes is provided.

21. An optical modulation device according to claim 12, wherein said liquid crystal having chiral smectic phase is a liquid crystal having C- or H- phase.

* * * * *

UNITED STATES PATENT AND TRADEMARK OFFICE
CERTIFICATE OF CORRECTION

PATENT NO. : 4,763,995
DATED : August 16, 1988
INVENTOR(S) : KAZUHARU KATAGIRI, ET AL.

It is certified that error appears in the above-identified patent and that said Letters Patent is hereby corrected as shown below:

COLUMN 9

Line 39, "e.g. SiO$_2$" should read --e.g. SiO, SiO$_2$--.

COLUMN 11

Line 16, "acetatal." should read --acetal,--.
　　Line 20, "epoxidized-,4-" should read --epoxidized-1,4---.

COLUMN 14

Line 20, "metacrylate, epoxidized 1," should read
　　　　　　--methacrylate, epoxidized-1,--.

COLUMN 19

Line 17, "oxide" should read --dioxide--.

COLUMN 21

Line 26, "socond" should read --second--.
　　Line 28, "striped" should read --stripe--.
　　Line 41, "substantilly" should read --substantially--.
　　Line 42, "redges" should read --ridges--.

UNITED STATES PATENT AND TRADEMARK OFFICE
CERTIFICATE OF CORRECTION

PATENT NO. : 4,763,995

DATED : August 16, 1988

INVENTOR(S) : KAZUHARU KATAGIRI, ET AL.

It is certified that error appears in the above-identified patent and that said Letters Patent is hereby corrected as shown below:

COLUMN 22

Line 8, "effect" should read --effect,--.
Line 16, "irienting" should read --orienting--.
Line 17, "molecule" should read --molecular--.
Line 20, "ral even" should read --ral structure even--.
Line 27, "devide" should read --device--.
Line 36, "pair" should read --pairs--.
Line 60, "rideges" should read --ridges--.

COLUMN 23

Line 10, "photo resists." should read --photoresists.--.

Signed and Sealed this

Sixteenth Day of May, 1989

Attest:

DONALD J. QUIGG

Attesting Officer

Commissioner of Patents and Trademarks